Patented Jan. 10, 1950

2,493,809

UNITED STATES PATENT OFFICE 2,493,809

MANUFACTURE OF POLYPHOSPHATES

Allen D. Garrison, Houston, Tex., assignor to Texaco Development Corporation, New York, N. Y., a corporation of Delaware No Drawing. Application January 18, 1946, Serial No. 642,109

2 Claims. (Cl. 23—106)

This invention relates to compounds of phosphorus and to a method of preparing them. The invention especially relates to valuable phosphate glasses which may be prepared simply and economically.

More specifically, the phosphate glasses are related to the group of phosphorus compounds which have come to be designated as polyphosphates. The polyphosphates also have been referred to as molecularly dehydrated phosphates. The principal polyphosphates and, so far as is known, the only compositions of this class which at present are of practical importance are tetrasodium pyrophosphate $(Na_4P_2O_7)$, disodium dihydrogen pyrophosphate $(Na_2H_2P_2O_7)$, sodium triphosphate $(Na_5P_3O_{10})$ and the material known commercially as sodium tetraphosphate $$(Na_6P_4O_{13})$$

The two pyrophosphates may be prepared by economical methods such as the molecular dehydration of sodium acid orthophosphates at relatively low temperatures. On the other hand, to prepare sodium triphosphate or the so-called sodium tetraphosphate, it has been necessary to employ methods involving the use of high temperatures, for example temperatures of the order of 750 to 900° C. The difficulties residing in these high temperature methods of preparation have had an adverse effect upon the commercial use of sodium triphosphate and sodium tetraphosphate, although these compositions have some properties which make them more valuable for many uses than the related compositions such as the pyrophosphates.

It is well known in the art that the salts of the higher polyphosphates cannot be prepared satisfactorily by making the acids and subsequently neutralizing them with alkali carbonates or hydroxides. This method produces a mixture of metaphosphates and pyrophosphates, and a good yield of the alkali polyphosphates is impossible.

The present invention is concerned with alkali metal phosphoric acid compositions which are solid phosphate glasses having compositions corresponding to partially neutralized salts of the higher polybasic polyphosphoric acids; that is, those containing more than 2 phosphorus atoms per molecular formula. More specifically the invention is concerned with compositions corresponding to alkali metal tetrahydrogen polyphosphates, such as the lithium, sodium and potassium tetrahydrogen tri-, tetra-, penta- and hexaphosphates, the term tetrahydrogen indicating the presence of four hydrogen atoms per molecular formula. They also are closely related from the standpoint of their chemical and physical properties to the higher polybasic polyphosphates but, as distinguished from the known compositions, they may be prepared by simple and economical methods. The compositions of the invention furthermore possess certain properties which distinguish them from the known higher polybasic polyphosphates and which make them more desirable for certain uses.

In accordance with the present invention I have discovered that solid partially neutralized alkali metal polyphosphate glasses having compositions corresponding to the general formula $$M_{(n-2)}H_4P_nO_{(3n+1)}$$

where M is an alkali metal, and $n$ is greater than 2, can be produced at relatively low temperatures in the range of 275 to 400° C. by employing a reactant mixture containing any combination of alkali metal, hydrogen, phosphorus and oxygen provided one of the reactants is a pyrophosphate or an orthophosphate which will on molecular dehydration yield a pyrophosphate and which in the reacting mixture is liquid at the temperature of the reaction, and provided the ratio of alkali metal to phosphorus in the mixture is the same as the ratio of these elements in the final product, that is, $n-2$ mols of alkali metal to $n$ mols of phosphorus. It is further provided, that when one of the reactants is an orthophosphate, the mixture shall require the removal of water of molecular constitution in order to attain the desired product.

I have made the surprising discovery that by selecting the reactant materials as outlined above such that the reactant mixture has an elemental composition substantially corresponding to that of a partially neutralized salt of a polybasic polyphosphoric acid, the mixture is in the liquid phase at a relatively low temperature as compared with the temperatures required in the presently known methods for the production of the polybasic polyphosphate complexes, and that this liquid phase material may be converted to a solid phosphate glass by cooling. It should be noted that in referring to the compositions described as partially neutralized salts of polybasic polyphosphoric acids it is not intended to imply that such salts have previously been prepared. In fact it is believed that these salts are new in the art.

In order to prepare the partially neutralized or tetrahydrogen alkali metal polyphosphate complexes I employ as the starting material any mixture of compounds which will meet the requirements set forth above. In general, however, I prefer to start with a reactant mixture comprising either an orthophosphate, a pyrophosphate or both and a metaphosphate; an alkali metal hydroxide or carbonate, or even another polyphosphate. In order for the reaction to proceed as desired I have found that the formation of the partially neutralized salts takes place through the medium of the pyrophosphate and therefore it is necessary to have present a pyrophosphoric acid compound. In carrying out the invention an orthophosphate may be used as a starting material but the desired reaction will not take place until at least a portion of the orthophosphate has been molecularly dehydrated to the pyro state. Also the orthophosphate must be of such composition that dehydration to the pyro stage results in the formation of pyrophosphoric acid or an alkali metal acid pyrophosphate. Suitable orthophosphates are orthophosphoric acid and the alkali metal dihydrogen orthophosphates.

Materials which may be used for reaction with the pyrophosphate include the metaphosphates such as metaphosphoric acid and sodium monometaphosphate, the polymetaphosphates such as sodium hexametaphosphate, the polybasic polyphosphates such as sodium tetraphosphate, and alkali metal hydroxides or carbonates.

The glassy complexes corresponding to the partially neutralized salts of the polyphosphoric acids may be prepared in a number of ways. In accordance with one manner of proceeding, pyrophosphoric acid is maintained at a temperature at which it is in the liquid phase. The pyrophosphoric acid may be prepared conveniently by molecularly dehydrating orthophosphoric acid. To accomplish this the orthophosphoric acid is heated to a temperature of the order of 200 to 300° C. or even higher. It is not necessary to complete the molecular dehydration of the orthophosphoric composition since the dehydration may be completed later.

After the pyrophosphoric acid is in the liquid phase the metaphosphate or other material for reaction, as mentioned previously, is added in proportions selected to yield a final product of the desired composition. It has generally been found that the metaphosphate, or other reactant material, will not combine with the pyrophosphoric acid at the low temperature at which the molecular dehydration of the orthophosphoric acid may be accomplished and therefore, following the addition of the metaphosphate or other reactant material the temperature is preferably raised sufficiently to effect liquid phase reaction of the materials. The temperature necessary to accomplish this will vary depending upon the specific composition of the mixture, but it has been found that temperatures within the range of about 270 to 400° C. generally will produce the desired results. For example the preparation of the tetrahydrogen triphosphates may be carried out at temperatures in the range of about 275 to 300° C., the corresponding so-called tetraphosphates at about 350 to 360° C., the pentaphosphates at about 390° C. and the hexaphosphates at about 390 to 400° C.

In accordance with another manner of proceeding, metaphosphoric acid is melted and a calculated amount of an alkali pyrophosphate is added and heating continued to complete the reaction and yield the desired composition. For example, 4 mols of metaphosphoric acid when melted and reacted with 1 mol of tetrasodium pyrophosphate will produce 1 mol of a glassy complex corresponding in composition to tetrasodium tetrahydrogen hexaphosphate. Or, 2 mols of metaphosphoric acid may be heated with 1 mol of disodium dihydrogen pyrophosphate to produce 1 mol of a glassy complex corresponding in composition to disodium tetrahydrogen tetraphosphate.

Another important advantage of the present invention lies in the high degree of fluidity of the products at relatively low temperatures. Thus the triphosphate compound is sufficiently liquid so as to be readily mobile at temperatures as low as 130° C. and the so-called tetraphosphate is sufficiently fluid at 200° C. to permit it to be readily poured. The so-called penta- and hexaphosphate required somewhat higher temperatures for an equivalent degree of fluidity but may be poured without trouble at the temperature at which they are prepared.

The liquid phase product is cooled to produce a solid phosphate glass. I have found that the cooling operation need not be practiced in any special manner since in most cases clear water soluble glasses may be obtained either by slow cooling or by shock chilling. This is particularly true in the case of the tri- and tetraphosphate compositions. In the case of the penta and hexa compositions the glassy products are inclined to become opaque and crystalline if the cooling is too slow. Even so the opaque materials are quickly and almost completely water soluble. In order to prevent this opacity I prefer to employ a fairly rapid cooling procedure to obtain perfectly clear and completely water soluble acid glasses. In any event the very rapid method of cooling known as shock chilling is not necessary although it may be employed if so desired.

It will be understood, of course, that this invention may be practiced in other ways, for example, when employing a pyrophosphoric compound the reactant materials may be mixed in the solid phase and then heated to the desired liquid reaction temperature, or an orthophosphate and a metaphosphate or its equivalent may be mixed in the solid phase and the resulting mixture heated to simultaneously accomplish both molecular dehydration of the orthophosphate to the pyro state and reaction of the pyro compound with the metaphosphate, or an orthophosphate may be melted but not molecularly dehydrated prior to the addition of the metaphosphate or its equivalent.

In order to fully understand the present invention a number of equations are given below for some of the possible reactions which may be carried out. It is to be understood however that these reactions are merely representative and are not to be construed to limit or restrict the invention in any way.

$$2H_3PO_4 + NaPO_3 \rightarrow NaH_4P_3O_{10} + H_2O$$
$$H_4P_2O_7 + NaPO_3 \rightarrow NaH_4P_3O_{10}$$
$$12H_3PO_4 + (NaPO_3)_6 \rightarrow 6NaH_4P_3O_{10} + 6H_2O$$
$$6H_4P_2O_7 + (NaPO_3)_6 \rightarrow 6NaH_4P_3O_{10}$$
$$12H_3PO_4 + Na_5P_3O_{10} \rightarrow 5NaH_4P_3O_{10} + 8H_2O$$
$$6H_4P_2O_7 + Na_5P_3O_{10} \rightarrow 5NaH_4P_3O_{10} + 2H_2O$$
$$3H_3PO_4 + NaOH \rightarrow NaH_4P_3O_{10} + 3H_2O$$
$$3H_4P_2O_7 + 2NaOH \rightarrow 2NaH_4P_3O_{10} + 3H_2O$$
$$6H_3PO_4 + Na_2CO_3 \rightarrow 2NaH_4P_3O_{10} + 5H_2O + CO_2$$
$$3H_4P_2O_7 + Na_2CO_3 \rightarrow 2NaH_4P_3O_{10} + 2H_2O + CO_2$$
$$2NaH_2PO_4 + 2HPO_3 \rightarrow Na_2H_4P_4O_{13} + H_2O$$
$$Na_2H_2P_2O_7 + 2HPO_3 \rightarrow Na_2H_4P_4O_{13}$$
$$2H_3PO_4 + 2NaPO_3 \rightarrow Na_2H_4P_4O_{13} + H_2O$$
$$H_4P_2O_7 + 2NaPO_3 \rightarrow Na_2H_4P_4O_{13}$$
$$2H_3PO_4 + 3NaPO_3 \rightarrow Na_3H_4P_5O_{16} + H_2O$$
$$H_4P_2O_7 + 3NaPO_3 \rightarrow Na_3H_4P_5O_{16}$$
$$2H_3PO_4 + 4NaPO_3 \rightarrow Na_4H_4P_6O_{19} + H_2O$$
$$H_4P_2O_7 + 4NaPO_3 \rightarrow Na_4H_4P_6O_{19}$$
$$Na_4P_2O_7 + 4HPO_3 \rightarrow Na_4H_4P_6O_{19}$$

It will be seen that the present method possesses important advantages as compared with the high temperature methods commonly used for the production of the higher polybasic polyphosphates. Thus, the reaction temperatures are considerably lower, 275° to 400° C., as compared with 750° to 900° C. Moreover, while shock chilling is necessary in the methods usually used for preparation of sodium triphosphate and sodium tetraphosphate glasses, shock chilling is not a required feature of the present method.

The phosphate glasses of the invention are characterized by being rapidly soluble in water as compared with the known available higher polybasic polyphosphates; they have calcium sequestering properties and therefore may be employed for the treatment of hard waters; and they posses deflocculating and viscosity reducing properties which make them valuable for use in the treatment or preparation of aqueous clay compositions such as drilling muds employed in the drilling of oil and gas wells and clay slips used for the manufacture of chinaware and pottery. The compositions are clear glasses, somewhat hygroscopic, but they may be handled satisfactorily as solid materials. They may be neutralized with alkali carbonates or hydroxides in water solutions, and the neutral solutions thus obtained are equivalent to the solutions containing the same amount of polybasic polyphosphates prepared by the well-known high temperature methods.

My invention therefore affords an improved method of preparing neutral solutions of polybasic polyphosphate compositions by simpler reactions at lower temperatures than heretofore possible, as well as a method of preparing the glassy tetrahydrogen alkali polyphosphate complexes which are new in the art.

In order that the invention may be understood more fully reference may be had to the following examples which will serve to illustrate preferred methods and compositions of the invention:

*Example I*

100 grams of commercial 85% orthophosphoric acid were molecularly dehydrated to pyrophosphoric acid by heating in a glass beaker at 275° C. When hydration to the pyro acid was completed, 44.2 grams of insoluble sodium monometaphosphate were added and the temperature raised to 310° C. The monometaphosphate dissolved rapidly in the pyrophosphoric acid at this temperature to give a clear liquid melt. The melt was chilled, and a clear glass was obtained, the composition of which corresponded to that of sodium tetrahydrogen triphosphate ($NaH_4P_3O_{10}$).

*Example II*

Six mols of commercial 85% orthophosphoric acid were heated to a temperature of 275° C. for 30 minutes. To the pyrophosphoric acid obtained was added one mol of sodium trimetaphosphate. The temperature was raised to 300° C. and maintained for 10 minutes, after which the liquid melt was chilled to obtain a clear glass having a composition corresponding to the formula $NaH_4P_3O_{10}$.

*Example III*

40.9 grams of commercial 85% orthophosphoric acid were heated to 280° C. until the weight of the sample was reduced to 32.1 grams. To this amount of the pyrophosphoric acid was added 36.2 grams of water-insoluble sodium monometaphosphate. The mixture was then heated to 315° C. to obtain a clear liquid melt and allowed to cool slowly to room temperature by standing overnight. The product obtained, which had a composition corresponding to that of disodium tetrahydrogen tetraphosphate ($Na_2H_4P_4O_{13}$) was a clear glass. A portion of this glassy product was subsequently reheated to 350° C., and the liquid melt was shock chilled. The glass obtained by the slow cooling procedure was identical to that obtained by shock chilling and was equally as soluble.

*Example IV*

50 grams of commercial 85% orthophosphoric acid were placed in a glass beaker and heated to 230° C. Some water was lost but not enough to convert all of the ortho acid into the pyro acid. At this temperature 22.2 grams of insoluble sodium monometaphosphate were added, and the melt heated to 310° C. A second 22.2 gram portion of insoluble sodium monometaphosphate was then added, and the heating continued to 360° C. On each addition the sodium monometaphosphate quickly went into solution and during the heating water of molecular constitution of the orthophosphoric acid was being driven off. A quantitative account was kept of the water lost by weighing the beaker and the melt. The composition of the final product corresponded to that of disodium tetrahydrogen tetraphosphate ($Na_2H_4P_4O_{13}$). Enough water was lost from the original orthophosphoric acid to result in its complete dehydration to the pyro acid and the tetraphosphate is accounted for as the reaction product from two mols of $NaPO_3$ and one mol of $H_4P_2O_7$.

*Example V*

50 grams of commercial 85% orthophosphoric acid were molecularly dehydrated to pyrophosphoric acid at 275° C. 44.2 grams of sodium trimetaphosphate were then added, and the resulting mixture heated to a maximum temperature of 310° C. The molten glass was chilled to obtain a solid glassy product having a composition corresponding to that of disodium tetrahydrogen tetraphosphate.

*Example VI*

17.2 grams of 85% commercial orthophosphoric acid were dehydrated to the pyro acid at a maximum temperature of 275° C. A 5 gram portion of lithium pyrophosphate ($Li_4P_2O_7$) was then added without increasing the temperature. The lithium pyrophosphate rapidly went into solution to give a clear melt. To this mixture 7.97 grams of metaphosphoric acid was added. The molten product was chilled, and a clear glassy product obtained which has a composition corresponding to that of lithium tetrahydrogen triphosphate, ($LiH_4P_3O_{10}$).

Obviously many modifications and variations of the invention, as hereinbefore set forth, may be made without departing from the spirit and scope thereof, and therefore only such limitations should be imposed as are indicated in the appended claims.

I claim:

1. The method of preparing at temperatures below 400° C. a polyphosphate glass having calcium sequestering and viscosity reducing properties, which comprises heating a mixture of a phosphoric compound and an alkali metal compound selected from the group consisting of the alkali metal hydroxide and the carbonate and phosphate salts thereof, at a liquid reaction temperature above 270° C. but below 400° C. until a clear liquid melt is obtained, the total phosphorus and the total alkali metal in the mixture being in the proportion of $n$ mols of phosphorus to $(n-2)$ mols of the alkali metal, then cooling the melt, and separating as a final solid product an acid polyphosphate glass melting below 400° C. and analyzing to a composition corresponding to the formula $M_{(n-2)}H_4P_nO_{(3n+1)}$, where M is an alkali metal, and $n$ is a whole number greater than 2, the said composition having the property of being neutralized in water solution with alkali metal carbonates and hydroxides to produce a neutral solution equivalent to a water solution containing the same amount of the corresponding neutral polybasic polyphosphate composition.

2. The method of preparing at temperatures below 400° C. a triphosphate glass having calcium sequestering and viscosity reducing properties, which comprises molecularly dehydrating orthophosphoric acid at least in part to pyrophosphoric acid and heating the same in a mixture with sodium carbonate at a liquid reaction temperature of about 275–300° C. until a clear liquid melt is obtained, the total phosphorus and the total sodium in the mixture being in a proportion to provide $n$ mols of phosphorus to $(n-2)$ mols of sodium, then cooling the melt, and separating as a final solid product an acid triphosphate glass melting around 130° C. and analyzing to a composition corresponding to the formula $NaH_4P_3O_{10}$, the said composition having the property of being neutralized in water solution with sodium carbonate and hydroxide to produce a neutral solution equivalent to a water solution containing the same amount of $Na_5P_3O_{10}$.

ALLEN D. GARRISON.

REFERENCES CITED

The following references are of record in the file of this patent:

UNITED STATES PATENTS

| Number | Name | Date |
|---|---|---|
| 674,140 | Patten | May 14, 1901 |
| 1,654,404 | Blumenberg | Dec. 27, 1927 |
| 2,322,850 | Jean | June 29, 1943 |
| 2,379,100 | Partridge | June 26, 1945 |
| 2,383,502 | Quimby | Aug. 28, 1945 |

FOREIGN PATENTS

| Number | Country | Date |
|---|---|---|
| 441,474 | Great Britain | Jan. 20, 1936 |

OTHER REFERENCES

Huber, "Z. Anorg. Allgem. Chem.," vol. 230 (1936), pp. 123–8.

Andress & Wust, "Z Anorg. Allgem. Chem.," vol. 237 (1938), pp. 113–31.

Partridge et al., "J. Am. Chem. Soc.," vol. 63 (1941), pp. 454–6.

Mellor, "Comprehensive Treatise On Inorganic and Theoretical Chemistry," vol. 2, Longmans Green & Co., New York (1922), p. 866.